United States Patent
Harel et al.

(10) Patent No.: US 9,060,362 B2
(45) Date of Patent: Jun. 16, 2015

(54) METHOD AND SYSTEM FOR ACCESSING AN OCCUPIED WI-FI CHANNEL BY A CLIENT USING A NULLING SCHEME

(71) Applicant: Magnolia Broadband Inc., Englewood, NJ (US)

(72) Inventors: Haim Harel, New York, NY (US); Stuart S. Jeffery, Los Altos, CA (US); Phil F. Chen, Denville, NJ (US); Sherwin J. Wang, Towaco, NJ (US); Kenneth Kludt, San Jose, CA (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 14/296,209

(22) Filed: Jun. 4, 2014

(65) Prior Publication Data

US 2015/0071270 A1    Mar. 12, 2015

Related U.S. Application Data

(60) Provisional application No. 61/876,886, filed on Sep. 12, 2013, provisional application No. 61/946,321, filed on Feb. 28, 2014, provisional application No. 61/946,391, filed on Feb. 28, 2014.

(51) Int. Cl.
*H04W 84/12* (2009.01)
*H04W 72/04* (2009.01)
*H04W 52/04* (2009.01)

(52) U.S. Cl.
CPC .......... *H04W 72/0413* (2013.01); *H04W 52/04* (2013.01); *H04W 84/12* (2013.01)

(58) Field of Classification Search
CPC ..................................................... H04W 84/12
USPC ......... 370/208, 252, 295, 310, 328, 334, 338; 375/264, 267, 299
See application file for complete search history.

(56) References Cited

U.S. PATENT DOCUMENTS

| 4,044,359 A | 8/1977 | Applebaum et al. |
| 4,079,318 A | 3/1978 | Kinoshita |

(Continued)

FOREIGN PATENT DOCUMENTS

| EP | 1 189 303 | 3/2002 |
| EP | 1 867 177 | 5/2010 |

(Continued)

OTHER PUBLICATIONS

Office Action issued by the United States Patent and Trademark Office for U.S. Appl. No. 13/630,146 dated Jan. 22, 2013.

(Continued)

*Primary Examiner* — Andrew Lai
*Assistant Examiner* — Andrew C Lee
(74) *Attorney, Agent, or Firm* — Pearl Cohen Zedek Latzer Baratz LLP

(57) ABSTRACT

A method and system for overriding Carrier-Sense-Multiple-Access/Collision-Avoidance (CSMA/CA) without harming the traffic that occupies the channel are provided. The system and method may include for example detecting at a communication node having a plurality of antennas, a preamble transmitted by a co-channel neighboring node operating in compliance with IEEE 802.11 standard within a clear channel assessment (CCA) range of the communication node; and setting uplink transmit weights of the antennas of the communication node, to isolate the communication node from the neighboring node after the neighboring node has transmitted the preamble, to allow the communication node to access the co-channel, by keeping a transmitted signal level of the communication node as received by the neighboring node, below the CCA signal level at one or more of the antennas of said neighboring node. The system may for example implement the method in software running on a baseband processor.

26 Claims, 12 Drawing Sheets

(56) References Cited

U.S. PATENT DOCUMENTS

| | | | |
|---|---|---|---|
| 4,359,738 A | 11/1982 | Lewis | |
| 4,540,985 A | 9/1985 | Clancy et al. | |
| 4,628,320 A | 12/1986 | Downie | |
| 5,162,805 A | 11/1992 | Cantrell | |
| 5,363,104 A | 11/1994 | Richmond | |
| 5,444,762 A | 8/1995 | Frey et al. | |
| 5,732,075 A | 3/1998 | Tangemann et al. | |
| 5,915,215 A | 6/1999 | Williams et al. | |
| 5,936,577 A | 8/1999 | Shoki et al. | |
| 5,940,033 A | 8/1999 | Locher et al. | |
| 6,018,317 A | 1/2000 | Dogan et al. | |
| 6,026,081 A | 2/2000 | Hamabe | |
| 6,046,655 A | 4/2000 | Cipolla | |
| 6,101,399 A | 8/2000 | Raleigh et al. | |
| 6,163,695 A | 12/2000 | Takemura | |
| 6,167,286 A | 12/2000 | Ward et al. | |
| 6,215,812 B1 | 4/2001 | Young et al. | |
| 6,226,507 B1 | 5/2001 | Ramesh et al. | |
| 6,230,123 B1 | 5/2001 | Mekuria et al. | |
| 6,259,683 B1 | 7/2001 | Sekine et al. | |
| 6,297,772 B1 | 10/2001 | Lewis | |
| 6,321,077 B1 | 11/2001 | Saitoh et al. | |
| 6,335,953 B1 | 1/2002 | Sanderford et al. | |
| 6,370,378 B1 | 4/2002 | Yahagi | |
| 6,377,783 B1 | 4/2002 | Lo et al. | |
| 6,393,282 B1 | 5/2002 | Iimori | |
| 6,584,115 B1 | 6/2003 | Suzuki | |
| 6,697,622 B1 | 2/2004 | Ishikawa et al. | |
| 6,697,633 B1 | 2/2004 | Dogan et al. | |
| 6,834,073 B1 | 12/2004 | Miller et al. | |
| 6,842,460 B1 * | 1/2005 | Olkkonen et al. | 370/465 |
| 6,914,890 B1 | 7/2005 | Tobita et al. | |
| 6,927,646 B2 | 8/2005 | Niemi | |
| 6,975,582 B1 | 12/2005 | Karabinis et al. | |
| 6,987,958 B1 | 1/2006 | Lo et al. | |
| 7,068,628 B2 | 6/2006 | Li et al. | |
| 7,177,663 B2 | 2/2007 | Axness et al. | |
| 7,190,964 B2 | 3/2007 | Damnjanovic et al. | |
| 7,257,425 B2 | 8/2007 | Wang et al. | |
| 7,299,072 B2 | 11/2007 | Ninomiya | |
| 7,392,015 B1 | 6/2008 | Farlow et al. | |
| 7,474,676 B2 | 1/2009 | Tao et al. | |
| 7,499,109 B2 | 3/2009 | Kim et al. | |
| 7,606,528 B2 | 10/2009 | Mesecher | |
| 7,719,993 B2 | 5/2010 | Li et al. | |
| 7,742,000 B2 | 6/2010 | Mohamadi | |
| 7,769,107 B2 | 8/2010 | Sandhu et al. | |
| 7,898,478 B2 | 3/2011 | Niu et al. | |
| 7,904,086 B2 | 3/2011 | Kundu et al. | |
| 7,970,366 B2 | 6/2011 | Arita et al. | |
| 8,078,109 B1 | 12/2011 | Mulcay | |
| 8,103,284 B2 | 1/2012 | Mueckenheim et al. | |
| 8,115,679 B2 | 2/2012 | Falk | |
| 8,155,613 B2 | 4/2012 | Kent et al. | |
| 8,275,377 B2 | 9/2012 | Nanda et al. | |
| 8,280,443 B2 | 10/2012 | Tao et al. | |
| 8,294,625 B2 | 10/2012 | Kittinger et al. | |
| 8,306,012 B2 | 11/2012 | Lindoff et al. | |
| 8,315,671 B2 | 11/2012 | Kuwahara et al. | |
| 8,369,436 B2 | 2/2013 | Stirling-Gallacher | |
| 8,509,190 B2 | 8/2013 | Rofougaran | |
| 8,520,657 B2 | 8/2013 | Rofougaran | |
| 8,526,886 B2 | 9/2013 | Wu et al. | |
| 8,588,844 B2 | 11/2013 | Shpak | |
| 8,599,955 B1 | 12/2013 | Kludt et al. | |
| 8,599,979 B2 | 12/2013 | Farag et al. | |
| 8,644,413 B2 | 2/2014 | Harel et al. | |
| 8,649,458 B2 | 2/2014 | Kludt et al. | |
| 8,666,319 B2 | 3/2014 | Kloper et al. | |
| 8,744,511 B2 * | 6/2014 | Jones et al. | 455/522 |
| 8,767,862 B2 | 7/2014 | Abreu et al. | |
| 8,942,134 B1 | 1/2015 | Kludt et al. | |
| 2001/0029326 A1 | 10/2001 | Diab et al. | |
| 2001/0038665 A1 | 11/2001 | Baltersee et al. | |
| 2002/0024975 A1 | 2/2002 | Hendler | |
| 2002/0051430 A1 | 5/2002 | Kasami et al. | |
| 2002/0065107 A1 | 5/2002 | Harel et al. | |
| 2002/0085643 A1 | 7/2002 | Kitchener et al. | |
| 2002/0107013 A1 | 8/2002 | Fitzgerald | |
| 2002/0115474 A1 | 8/2002 | Yoshino et al. | |
| 2002/0181426 A1 * | 12/2002 | Sherman | 370/338 |
| 2002/0181437 A1 | 12/2002 | Ohkubo et al. | |
| 2003/0087645 A1 | 5/2003 | Kim et al. | |
| 2003/0114162 A1 | 6/2003 | Chheda et al. | |
| 2003/0153322 A1 | 8/2003 | Burke et al. | |
| 2003/0153360 A1 | 8/2003 | Burke et al. | |
| 2003/0186653 A1 | 10/2003 | Mohebbi et al. | |
| 2003/0203717 A1 | 10/2003 | Chuprun et al. | |
| 2004/0023693 A1 | 2/2004 | Okawa et al. | |
| 2004/0056795 A1 | 3/2004 | Ericson et al. | |
| 2004/0063455 A1 | 4/2004 | Eran et al. | |
| 2004/0081144 A1 | 4/2004 | Martin et al. | |
| 2004/0121810 A1 | 6/2004 | Goransson et al. | |
| 2004/0125899 A1 | 7/2004 | Li et al. | |
| 2004/0125900 A1 | 7/2004 | Liu et al. | |
| 2004/0142696 A1 | 7/2004 | Saunders et al. | |
| 2004/0147266 A1 | 7/2004 | Hwang et al. | |
| 2004/0156399 A1 | 8/2004 | Eran | |
| 2004/0166902 A1 | 8/2004 | Castellano et al. | |
| 2004/0198292 A1 | 10/2004 | Smith et al. | |
| 2004/0228388 A1 | 11/2004 | Salmenkaita | |
| 2004/0235527 A1 | 11/2004 | Reudink et al. | |
| 2004/0264504 A1 * | 12/2004 | Jin | 370/469 |
| 2005/0068230 A1 | 3/2005 | Munoz et al. | |
| 2005/0068918 A1 | 3/2005 | Mantravadi et al. | |
| 2005/0075140 A1 | 4/2005 | Famolari | |
| 2005/0129155 A1 | 6/2005 | Hoshino | |
| 2005/0147023 A1 | 7/2005 | Stephens et al. | |
| 2005/0163097 A1 | 7/2005 | Do et al. | |
| 2005/0245224 A1 | 11/2005 | Kurioka | |
| 2005/0250544 A1 | 11/2005 | Grant et al. | |
| 2005/0254513 A1 | 11/2005 | Cave et al. | |
| 2005/0265436 A1 | 12/2005 | Suh et al. | |
| 2005/0286440 A1 | 12/2005 | Strutt et al. | |
| 2005/0287962 A1 | 12/2005 | Mehta et al. | |
| 2006/0041676 A1 | 2/2006 | Sherman | |
| 2006/0092889 A1 * | 5/2006 | Lyons et al. | 370/338 |
| 2006/0094372 A1 | 5/2006 | Ahn et al. | |
| 2006/0111149 A1 | 5/2006 | Chitrapu et al. | |
| 2006/0135097 A1 | 6/2006 | Wang et al. | |
| 2006/0183503 A1 | 8/2006 | Goldberg | |
| 2006/0203850 A1 | 9/2006 | Johnson et al. | |
| 2006/0227854 A1 | 10/2006 | McCloud et al. | |
| 2006/0264184 A1 | 11/2006 | Li et al. | |
| 2006/0270343 A1 | 11/2006 | Cha et al. | |
| 2006/0271969 A1 | 11/2006 | Takizawa et al. | |
| 2006/0285507 A1 | 12/2006 | Kinder et al. | |
| 2007/0041398 A1 | 2/2007 | Benveniste | |
| 2007/0058581 A1 | 3/2007 | Benveniste | |
| 2007/0076675 A1 | 4/2007 | Chen | |
| 2007/0093261 A1 | 4/2007 | Hou et al. | |
| 2007/0097918 A1 | 5/2007 | Cai et al. | |
| 2007/0115882 A1 | 5/2007 | Wentink | |
| 2007/0115914 A1 | 5/2007 | Ohkubo et al. | |
| 2007/0152903 A1 | 7/2007 | Lin et al. | |
| 2007/0217352 A1 | 9/2007 | Kwon | |
| 2007/0223380 A1 | 9/2007 | Gilbert et al. | |
| 2008/0043867 A1 | 2/2008 | Blanz et al. | |
| 2008/0051037 A1 | 2/2008 | Molnar et al. | |
| 2008/0095163 A1 | 4/2008 | Chen et al. | |
| 2008/0108352 A1 | 5/2008 | Montemurro et al. | |
| 2008/0125120 A1 | 5/2008 | Gallagher et al. | |
| 2008/0144737 A1 | 6/2008 | Naguib | |
| 2008/0165732 A1 | 7/2008 | Kim et al. | |
| 2008/0238808 A1 | 10/2008 | Arita et al. | |
| 2008/0240314 A1 * | 10/2008 | Gaal et al. | 375/346 |
| 2008/0280571 A1 | 11/2008 | Rofougaran et al. | |
| 2008/0285637 A1 | 11/2008 | Liu et al. | |
| 2009/0003299 A1 * | 1/2009 | Cave et al. | 370/338 |
| 2009/0028225 A1 | 1/2009 | Runyon et al. | |
| 2009/0046638 A1 | 2/2009 | Rappaport et al. | |
| 2009/0058724 A1 | 3/2009 | Xia et al. | |
| 2009/0121935 A1 | 5/2009 | Xia et al. | |
| 2009/0137206 A1 | 5/2009 | Sherman et al. | |

(56) References Cited

U.S. PATENT DOCUMENTS

| | | |
|---|---|---|
| 2009/0154419 A1 | 6/2009 | Yoshida et al. |
| 2009/0187661 A1 | 7/2009 | Sherman |
| 2009/0190541 A1 | 7/2009 | Abedi |
| 2009/0227255 A1 | 9/2009 | Thakare |
| 2009/0239486 A1 | 9/2009 | Sugar et al. |
| 2009/0268616 A1 | 10/2009 | Hosomi |
| 2009/0285331 A1 | 11/2009 | Sugar et al. |
| 2009/0322610 A1 | 12/2009 | Hants et al. |
| 2009/0322613 A1 | 12/2009 | Bala et al. |
| 2009/0323608 A1 | 12/2009 | Adachi et al. |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0067473 A1* | 3/2010 | Cave et al. ............ 370/329 |
| 2010/0111039 A1 | 5/2010 | Kim et al. |
| 2010/0117890 A1 | 5/2010 | Vook et al. |
| 2010/0135420 A1 | 6/2010 | Xu et al. |
| 2010/0150013 A1 | 6/2010 | Hara et al. |
| 2010/0172429 A1 | 7/2010 | Nagahama et al. |
| 2010/0195560 A1 | 8/2010 | Nozaki et al. |
| 2010/0195601 A1 | 8/2010 | Zhang |
| 2010/0208712 A1 | 8/2010 | Wax et al. |
| 2010/0222011 A1 | 9/2010 | Behzad |
| 2010/0232355 A1 | 9/2010 | Richeson et al. |
| 2010/0234071 A1 | 9/2010 | Shabtay et al. |
| 2010/0278063 A1* | 11/2010 | Kim et al. ............ 370/252 |
| 2010/0283692 A1 | 11/2010 | Achour et al. |
| 2010/0285752 A1 | 11/2010 | Lakshmanan et al. |
| 2010/0291931 A1 | 11/2010 | Suemitsu et al. |
| 2010/0303170 A1 | 12/2010 | Zhu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0085465 A1 | 4/2011 | Lindoff et al. |
| 2011/0085532 A1 | 4/2011 | Scherzer et al. |
| 2011/0105036 A1 | 5/2011 | Rao et al. |
| 2011/0116489 A1* | 5/2011 | Grandhi ............ 370/338 |
| 2011/0134816 A1 | 6/2011 | Liu et al. |
| 2011/0150050 A1 | 6/2011 | Trigui et al. |
| 2011/0150066 A1 | 6/2011 | Fujimoto |
| 2011/0151826 A1 | 6/2011 | Miller et al. |
| 2011/0163913 A1 | 7/2011 | Cohen et al. |
| 2011/0205883 A1 | 8/2011 | Mihota |
| 2011/0205998 A1 | 8/2011 | Hart et al. |
| 2011/0228742 A1 | 9/2011 | Honkasalo et al. |
| 2011/0249576 A1 | 10/2011 | Chrisikos et al. |
| 2011/0250884 A1 | 10/2011 | Brunel et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2011/0310827 A1 | 12/2011 | Srinivasa et al. |
| 2011/0310853 A1 | 12/2011 | Yin et al. |
| 2012/0014377 A1 | 1/2012 | Joergensen et al. |
| 2012/0015603 A1 | 1/2012 | Proctor et al. |
| 2012/0020396 A1 | 1/2012 | Hohne et al. |
| 2012/0027000 A1 | 2/2012 | Wentink |
| 2012/0028638 A1 | 2/2012 | Mueck et al. |
| 2012/0028655 A1 | 2/2012 | Mueck et al. |
| 2012/0028671 A1 | 2/2012 | Niu et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0051287 A1 | 3/2012 | Merlin et al. |
| 2012/0064838 A1 | 3/2012 | Miao et al. |
| 2012/0069828 A1 | 3/2012 | Taki et al. |
| 2012/0076028 A1 | 3/2012 | Ko et al. |
| 2012/0076229 A1 | 3/2012 | Brobston et al. |
| 2012/0088512 A1 | 4/2012 | Yamada et al. |
| 2012/0092217 A1 | 4/2012 | Hosoya et al. |
| 2012/0100802 A1 | 4/2012 | Mohebbi |
| 2012/0115523 A1 | 5/2012 | Shpak |
| 2012/0155349 A1 | 6/2012 | Bajic et al. |
| 2012/0155397 A1 | 6/2012 | Shaffer et al. |
| 2012/0163257 A1 | 6/2012 | Kim et al. |
| 2012/0163302 A1 | 6/2012 | Takano |
| 2012/0170453 A1 | 7/2012 | Tiwari |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1 | 8/2012 | Petersson et al. |
| 2012/0213065 A1 | 8/2012 | Koo et al. |
| 2012/0218962 A1 | 8/2012 | Kishiyama et al. |
| 2012/0220331 A1 | 8/2012 | Luo et al. |
| 2012/0230380 A1 | 9/2012 | Keusgen et al. |
| 2012/0251031 A1 | 10/2012 | Suarez et al. |
| 2012/0270531 A1* | 10/2012 | Wright et al. ............ 455/419 |
| 2012/0270544 A1 | 10/2012 | Shah |
| 2012/0281598 A1 | 11/2012 | Struhsaker et al. |
| 2012/0314570 A1 | 12/2012 | Forenza et al. |
| 2012/0321015 A1* | 12/2012 | Hansen et al. ............ 375/295 |
| 2012/0327870 A1 | 12/2012 | Grandhi et al. |
| 2013/0010623 A1 | 1/2013 | Golitschek |
| 2013/0017794 A1* | 1/2013 | Kloper et al. ............ 455/63.1 |
| 2013/0023225 A1 | 1/2013 | Weber |
| 2013/0044877 A1 | 2/2013 | Liu et al. |
| 2013/0051283 A1 | 2/2013 | Lee et al. |
| 2013/0058239 A1 | 3/2013 | Wang et al. |
| 2013/0070741 A1 | 3/2013 | Li et al. |
| 2013/0079048 A1* | 3/2013 | Cai et al. ............ 455/517 |
| 2013/0094437 A1 | 4/2013 | Bhattacharya |
| 2013/0094621 A1 | 4/2013 | Luo et al. |
| 2013/0095780 A1 | 4/2013 | Prazan et al. |
| 2013/0101073 A1 | 4/2013 | Zai et al. |
| 2013/0150012 A1 | 6/2013 | Chhabra et al. |
| 2013/0156016 A1 | 6/2013 | Debnath et al. |
| 2013/0156120 A1 | 6/2013 | Josiam et al. |
| 2013/0170388 A1 | 7/2013 | Ito et al. |
| 2013/0172029 A1 | 7/2013 | Chang et al. |
| 2013/0190006 A1 | 7/2013 | Kazmi et al. |
| 2013/0208587 A1* | 8/2013 | Bala et al. ............ 370/230 |
| 2013/0208619 A1 | 8/2013 | Kudo et al. |
| 2013/0223400 A1* | 8/2013 | Seo et al. ............ 370/329 |
| 2013/0229996 A1* | 9/2013 | Wang et al. ............ 370/329 |
| 2013/0229999 A1 | 9/2013 | Da Silva et al. |
| 2013/0235720 A1* | 9/2013 | Wang et al. ............ 370/229 |
| 2013/0242853 A1 | 9/2013 | Seo et al. |
| 2013/0242899 A1 | 9/2013 | Lysejko et al. |
| 2013/0242965 A1 | 9/2013 | Horn et al. |
| 2013/0242976 A1 | 9/2013 | Katayama et al. |
| 2013/0252621 A1 | 9/2013 | Dimou et al. |
| 2013/0272437 A1 | 10/2013 | Eidson et al. |
| 2013/0301551 A1* | 11/2013 | Ghosh et al. ............ 370/329 |
| 2013/0331136 A1 | 12/2013 | Yang et al. |
| 2013/0343369 A1 | 12/2013 | Yamaura |
| 2014/0010089 A1* | 1/2014 | Cai et al. ............ 370/241 |
| 2014/0010211 A1 | 1/2014 | Asterjadhi et al. |
| 2014/0029433 A1 | 1/2014 | Wentink |
| 2014/0071873 A1* | 3/2014 | Wang et al. ............ 370/311 |
| 2014/0086077 A1 | 3/2014 | Safavi |
| 2014/0086081 A1* | 3/2014 | Mack et al. ............ 370/252 |
| 2014/0098681 A1* | 4/2014 | Stager et al. ............ 370/252 |
| 2014/0119288 A1 | 5/2014 | Zhu et al. |
| 2014/0185501 A1 | 7/2014 | Park et al. |
| 2014/0185535 A1* | 7/2014 | Park et al. ............ 370/329 |
| 2014/0192820 A1* | 7/2014 | Azizi et al. ............ 370/445 |
| 2014/0204821 A1 | 7/2014 | Seok et al. |
| 2014/0241182 A1 | 8/2014 | Smadi |
| 2014/0307653 A1 | 10/2014 | Liu et al. |

FOREIGN PATENT DOCUMENTS

| | | |
|---|---|---|
| EP | 2 234 355 | 9/2010 |
| EP | 2 498 462 | 9/2012 |
| JP | 2009-182441 | 8/2009 |
| JP | 2009-278444 | 11/2009 |
| WO | WO 03/047033 | 6/2003 |
| WO | WO 03/073645 | 9/2003 |
| WO | WO 2010/085854 | 8/2010 |

(56) References Cited

FOREIGN PATENT DOCUMENTS

| WO | WO 2011/060058 | 5/2011 |
|---|---|---|
| WO | WO 2013/192112 | 12/2013 |

OTHER PUBLICATIONS

Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.
Office Action issued by the United States Patent and Trademark Office for U.S. Appl. No. 14/085,252 dated Jun. 18, 2014.
Office Action issued by the United States Patent and Trademark Office for U.S. Appl. No. 14/094,644 dated Jun. 24, 2014.
Notice of Allowance issued by the United States Patent and Trademark Office for U.S. Appl. No. 14/102,539 dated Jun. 24, 2014.
Office Action issued by the United States Patent and Trademark Office for U.S. Appl. No. 14/011,521 dated Jul. 1, 2014.
Notice of Allowance issued by the United States Patent and Trademark Office for U.S. Appl. No. 14/109,904 dated Jul. 2, 2014.
Notice of Allowance issued by the United States Patent and Trademark Office for U.S. Appl. No. 13/889,150 dated Jul. 8, 2014.
Office Action issued by the United States Patent and Trademark Office for U.S. Appl. No. 14/250,767 dated Jul. 10, 2014.
Notice of Allowance issued by the United States Patent and Trademark Office for U.S. Appl. No. 14/085,352 dated Jul. 23, 2014.
Notice of Allowance issued by the United States Patent and Trademark Office for U.S. Appl. No. 14/013,190 dated Jul. 25, 2014.
Office Action issued by the United States Patent and Trademark Office for U.S. Appl. No. 14/198,280 dated Jul. 29, 2014.
Office Action issued by the United States Patent and Trademark Office for U.S. Appl. No. 14/042,020 dated Jul. 31, 2014.
Notice of Allowance issued by the United States Patent and Trademark Office for U.S. Appl. No. 14/010,771 dated Aug. 6, 2014.
Office Action issued by the United States Patent and Trademark Office for U.S. Appl. No. 14/306,458 dated Aug. 13, 2014.
Office Action issued by the United States Patent and Trademark Office for U.S. Appl. No. 14/297,898 dated Aug. 15, 2014.
Notice of Allowance issued by the United States Patent and Trademark Office for U.S. Appl. No. 14/085,252 dated Aug. 27, 2014.
Office Action issued by the United States Patent and Trademark Office for U.S. Appl. No. 14/181,844 dated Aug. 29, 2014.
Notice of Allowance issued by the United States Patent and Trademark Office for U.S. Appl. No. 14/097,765 dated Sep. 8, 2014.

(56) References Cited

OTHER PUBLICATIONS

Notice of Allowance issued by the United States Patent and Trademark Office for U.S. Appl. No. 14/143,580 dated Sep. 8, 2014.
Office Action issued by the United States Patent and Trademark Office for U.S. Appl. No. 14/198,155 dated Sep. 12, 2014.
Office Action issued by the United States Patent and Trademark Office for U.S. Appl. No. 14/173,640 dated Oct. 6, 2014.
Office Action issued by the United States Patent and Trademark Office for U.S. Appl. No. 14/449,431 dated Oct. 10, 2014.
Office Action issued by the United States Patent and Trademark Office for U.S. Appl. No. 14/171,736 dated Oct. 16, 2014.
Notice of Allowance issued by the United States Patent and Trademark Office for U.S. Appl. No. 14/011,521 dated Oct. 20, 2014.
Office Action issued by the United States Patent and Trademark Office for U.S. Appl. No. 14/320,920 dated Oct. 23, 2014.
Notice of Allowance issued by the United States Patent and Trademark Office for U.S. Appl. No. 13/889,150 dated Nov. 10, 2014.
Office Action issued by the United States Patent and Trademark Office for U.S. Appl. No. 13/775,886 dated Nov. 17, 2014.
Notice of Allowance issued by the United States Patent and Trademark Office for U.S. Appl. No. 14/198,280 dated Nov. 18, 2014.
Office Action issued by the United States Patent and Trademark Office for U.S. Appl. No. 14/480,920 dated Nov. 18, 2014.
Office Action issued by the United States Patent and Trademark Office for U.S. Appl. No. 14/481,319 dated Nov. 19, 2014.
Notice of Allowance issued by the United States Patent and Trademark Office for U.S. Appl. No. 14/198,155 dated Jan. 26, 2015.
International Search Report and Written Opinion for PCT International Application No. PCT/US2014/064346 dated Jan. 29, 2015.
Mitsubishi Electric, "Discussion on Antenna Calibration in TDD", 3GPP Draft; R1-090043, 3Generation Partnership Project (3GPP), Mobile Competence Centre; 650, Route Des Lucioles; F-06921 Sophia-Antipolis Cedex; France, No. Ljubljana; Jan. 7, 2009, pp. 1-4.
Alcatel-Lucent Shanghai Bell et al., "Antenna Array Calibration for TDD CoMP", 3GPP Draft; R1-100427, $3^{rd}$ Generation Partnership Project (3GPP), Mobile Competence Centre; 650, Route Des Lucioles; F-06921 Sophia-Antipolis Cedex; France, vol. RAN WG1, No. Valencia, Spain; 20100118, Jan. 12, 2010, pp. 1-5.
Notice of Allowance issued by the United States Patent and Trademark Office for U.S. Appl. No. 13/925,454 dated Feb. 3, 2015.
Office Action issued by the United States Patent and Trademark Office for U.S. Appl. No. 14/173,640 dated Feb. 3, 2015.
International Search Report and Written Opinion for PCT International Application No. PCT/US2014/064185 dated Feb. 5, 2015.
Kai Yang et al., "Coordinated Dual-Layer Beamforming for Public Safety Network: Architecture and Algorithms", Communications (ICC), 2012 IEEE International Conference on, IEEE, Jun. 10, 2012, pp. 4095-4099.
Songtao et al., "A Distributed Adaptive GSC Beamformer over Coordinated Antenna Arrays Network for Interference Mitigation", Asilomar Conference on Signals, Systems and Computers, Conference Record, IEEE Computer Society, US, Nov. 4, 2012, pp. 237-242.
International Search Report and Written Opinion for PCT International Application No. PCT/US2014/065635 dated Feb. 13, 2015.
Notice of Allowance issued by the United States Patent and Trademark Office for U.S. Appl. No. 14/171,736 mailed Feb. 20, 2015.
Office Action issued by the United States Patent and Trademark Office for U.S. Appl. No. 14/320,920 dated Feb. 23, 2015.
Office Action issued by the United States Patent and Trademark Office for U.S. Appl. No. 13/775,886 dated Mar. 23, 2015.
Notice of Allowance issued by the United States Patent and Trademark Office for U.S. Appl. No. 14/449,431 dated Mar. 23, 2015.
Notice of Allowance issued by the United States Patent and Trademark Office for U.S. Appl. No. 14/273,866 dated Mar. 25, 2015.
Office Action issued by the United States Patent and Trademark Office for U.S. Appl. No. 14/517,114 dated Apr. 6, 2015.

* cited by examiner

1110 — detecting at a communication node having a plurality of antennas, a preamble transmitted by a co-channel neighboring node operating in compliance with IEEE 802.11 standard within a clear channel assessment (CCA) range of the communication node 1120 — setting uplink transmit weights of the antennas of the communication node and further adjusting transmit power level of the communication node in a way that isolates the communication node from the neighboring node after the neighboring node has transmitted the preamble, in a manner that allows the communication node to access the co-channel, by keeping a transmitted signal level of the communication node as received by the neighboring node, below the CCA signal level at one or more of the antennas of the neighboring node

METHOD AND SYSTEM FOR ACCESSING AN OCCUPIED WI-FI CHANNEL BY A CLIENT USING A NULLING SCHEME

CROSS-REFERENCE TO RELATED APPLICATIONS

This application claims benefit from U.S. provisional patent application Ser. No. 61/876,886 filed on Sep. 12, 2013, U.S. provisional application Ser. No. 61/946,321 filed on Feb. 28, 2014, and U.S. provisional application Ser. No. 61/946, 391 filed on Feb. 28, 2014, each of which are incorporated herein by reference in their entirety.

FIELD OF THE INVENTION

The present invention relates generally to wireless communication, and more specifically to high efficiency Wi-Fi.

BACKGROUND OF THE INVENTION

Prior to setting forth the background of the invention, it may be helpful to set forth definitions of certain terms that will be used hereinafter.

The term "Wi-Fi" as used herein is defined as any wireless local area network (WLAN) products that are based on the Institute of Electrical and Electronics Engineers (IEEE) 802.11 standards.

The term "Access Point" or "AP" as used herein is defined as a device that allows wireless devices (also known as User Equipment or "UE") to connect to a wired network using Wi-Fi, or related standards. The AP usually connects to a router (via a wired network) as a standalone device, but it can also be an integral component of the router itself.

The term "client" as used herein is defined as any device that has wireless communication capabilities, specifically, the IEEE 802.11 standards. A client may be for example a smart telephone, a laptop, a tablet or a personal computer (PC).

The notation "STA" as used herein is defined in as an IEEE 802.11 client.

The term "node" as used herein is defined as general name for both IEEE 802.11 AP and IEEE 802.11 STA.

he term "serving AP" as used herein is defined in relation to one AP and one STA, wherein the STA is registered to said AP, and said AP and STA are sending and receiving data to and from each other.

The term "neighboring APs" or "neighboring nodes" relate to two co-frequency (or co-channel) APs or nodes that are within each other's sensitivity range, e.g. at least one of them can receive the other in such an signal-to-noise ratio to allows decoding of signals.

The term "CCA range" as used herein is a range between two IEEE 802.11 nodes, wherein at least one node can receive the other's transmission at a power level equal or larger than −82 dBm.

The term "CSMA-CA" stands for Carrier-Sense-Multiple-Access-Collision-Avoidance, representing a requirement to listen before transmitting in a multi-node wireless system that shares a common channel on the basis of first-come-first-served.

The term "preamble" as used herein describes a certain 802.11 transmitted signal modulation appearing at the beginning of each packet, that when received by other 802.11 nodes, will force them to yield channel access.

The notation "SINR" stands for Signal to Interference and Noise.

The term "ACK" as used herein, stands for acknowledgement, and is defined as the signal transmitted from an IEEE 802.11 receiving node to the IEEE 802.11 node that has transmitted a packet to it, provided the packet was successfully received.

The term "time division duplex" (TDD) as used herein referred to systems using the same frequency spectrum for methods of communications in a time division manner such as Wi-Fi systems.

Implicit feedback is a process used for TDD protocols such as Wi-Fi, where both down and up links share the same spectrum. In the aforementioned process, the uplink channel estimated by the AP, is assumed to be identical to the downlink one—based on reciprocity principle—and is therefore is considered by the AP to represent the channel towards the client/STA.

Explicit feedback is a procedure where AP transmissions are channel estimated by the STA, and then fed back to the AP, providing it with the magnitude of phase and amplitude differences between the signals as transmitted by the AP vis-à-vis as received by the client/STA, allowing it to gauge possible distortions and correct them.

Associated STA is defined herein as a STA that is served by a certain AP with a certain Service Set Identifier (SSID).

Non-associated STA is defined herein as a STA within the range of and non-serving AP and/or its non-serving STAs.

The acronym "NAV" stands for Network-Allocation-Vector and represents virtual carrier sense mechanism, used by a Wi-Fi transmitting message to broadcast the predicted duration of its transmission, signaling to other nodes how long will the channel be occupied.

The acronym "RTS" stands for Request-To-Send, and represents a message transmitted by one Wi-Fi node to another, probing it for information about its availability to receive data, per the Wi-Fi Alliance protocol.

The acronym "CTS" stands for Clear-To-Send, and represents a positive response from the said other node to the node originating the RTS, indicating to the requesting node that the channel is clear from its point of view as well.

The notation "DURATION" is a message embedded in both RTS and CTS, representing a prediction of the future traffic about to be transmitted between two nodes that have captured the channel; other nodes that receive it, must clear the channel as long as the DURATION has nor expired; other nodes that have received the RTS but received the CTS (hidden nodes) will avoid accessing the channel, allowing the receiving node to successfully complete the reception.

The acronym "FLA" stands for Fast Link Adaptation, and represents processed that reduce transmitting side learning time of the receiver's SINR.

The acronym "MCS" stands for Modulation Coding Scheme, mapping SINR to modulation order and code rate.

The acronym "MRQ" stands for MCS request (Modulation Code Scheme Request)

The acronym "MSI" stands for MRQ Sequence Identifier, which carries MCS feedback from receiver to transmitter.

The term "null" as used herein, is a spatial pattern, created by two or more antennas, formed in such a way that significantly reduces the power level received by a given receiver (e.g., a local minimum). An "Rx Null" is a null formed by a receiver's antennas weight in order to decrease undesired signal level. A "Tx Null" is formed by transmitter's antennas weights in order to decrease its undesired transmitted signal at remote receiver's input.

The term "Nulling STA" as used herein, is a station (client) that is equipped with nulling capabilities.

The term "Nulled AP" as used herein is an Access Point within CCA from a Nulling STA.

The term "Neighbors list" as used herein is a list of neighboring APs and STAs within CCA range which keeps history to be checked.

According to the IEEE 802.11 air protocol, two neighboring APs can download traffic over the same frequency channel to their respective STAs, as long as these APs are not within CCA range of each other.

When an RTS/CTS procedure is used, an additional condition is introduced. Namely, a legacy STA receiving the download traffic from its serving AP, must not be within CCA range of the other neighboring AP if said AP is occupying the channel.

SUMMARY OF THE INVENTION

In order to overcome the aforementioned condition, embodiments of a method of overriding CSMA/CA and virtual carrier sense, without harming the traffic that occupies the channel are provided herein. Embodiments of the present invention also provide measurements and qualifying criteria for performing the aforementioned channel simultaneous sharing. A method according to some embodiments of the present invention is based on generating spatial isolation of one node from another.

In one embodiment of the present invention, a Wi-Fi STA detecting a Preamble from a neighboring AP, and subsequently receiving a RTS from its serving AP, may transmit a CTS message to its serving AP, if said STA can transform the signal received from it by said neighboring AP in such a way that will not harmfully interfere with said neighboring AP's successful packet ACK by its client STA.

The aforementioned transformation of the signal received by the neighboring AP, can be performed by the STA via power level reduction, and/or via modifying its overall antennas patterns in a way that produces a Tx null at the one or more of the neighboring APs antennas.

Additionally, the aforementioned STA may reduce its transmitted power level by 10*log(N), where N being the known or assumed number of said neighboring nulled AP's antennas, thus compensating for the loss of Maximal Ratio Combining (MRC) gain that could have stemmed from protecting all said N antennas from the STA's interfering signal The aforementioned reduction of transmitted power level by the nulling STA, is not carried out in a case that the nulling STA estimates that said ACK signal is strong enough to be received without errors by the nulled neighboring AP.

Such estimation may be performed by the STA via registering the MCS sent by said neighboring AP to its served STA, thus deriving the perceived SINR in the neighboring AP's downlink, then assuming roughly a similar SINR for the corresponding uplink channel.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be more fully understood by reference to the following detailed description when read with the accompanying drawings in which:

FIG. 11 is a high level flowchart illustrating a method in accordance with some embodiments of the present invention.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Figure 1A:
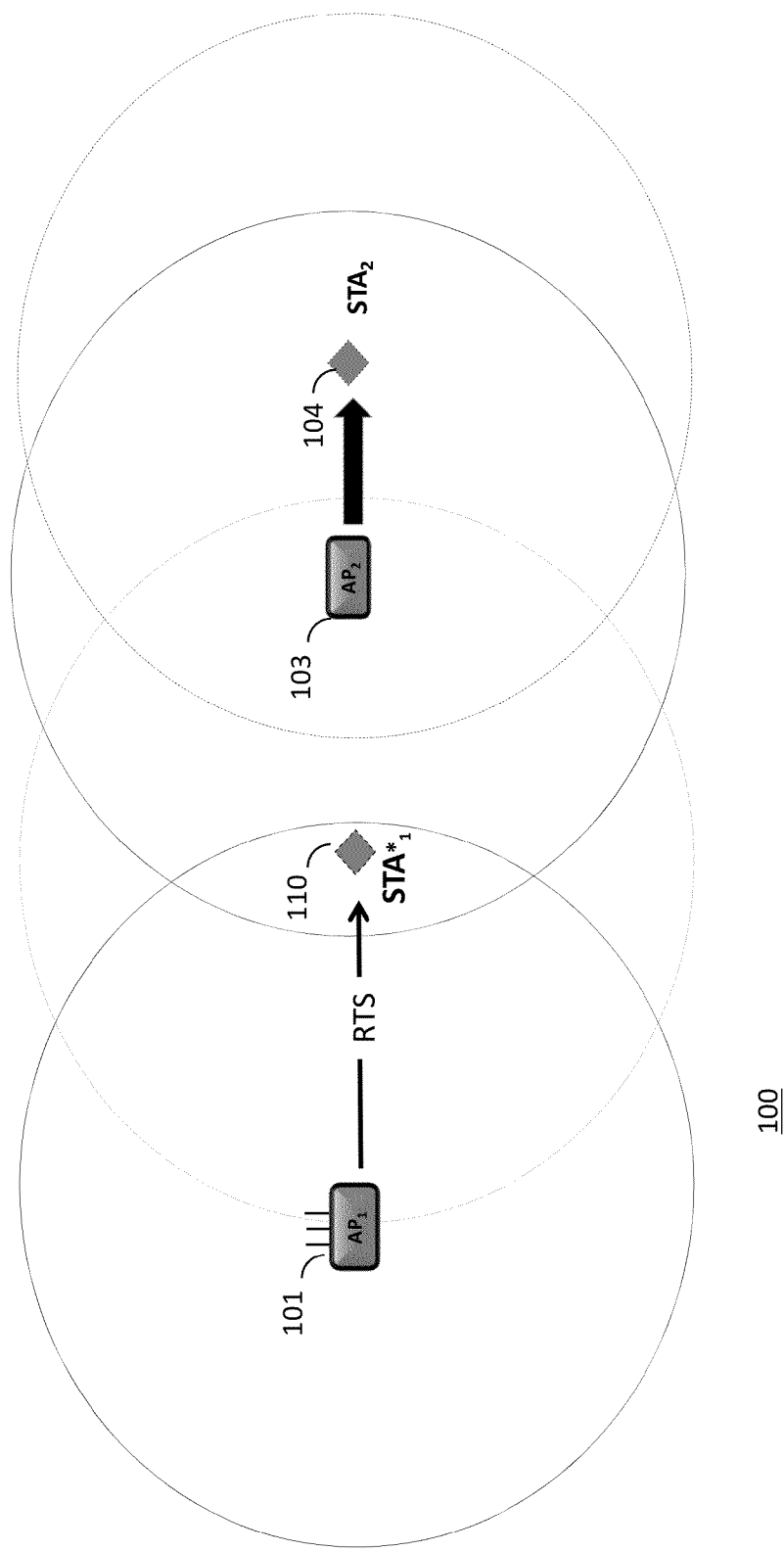
FIG. 1A is a block diagram illustrating neighboring APs, wherein a STA served by one of said APs is located in the area between said two APs in accordance with some embodiments of the present invention.

FIG. 1A is a block diagram illustrating apparatus with initial conditions wherein a Wi-Fi STA 110 receives a RTS from its serving AP 101, after a neighboring AP 103 within its CCA range, has occupied the channel and is in process of downloading a packet to its client STA 104.

Figure 1B:
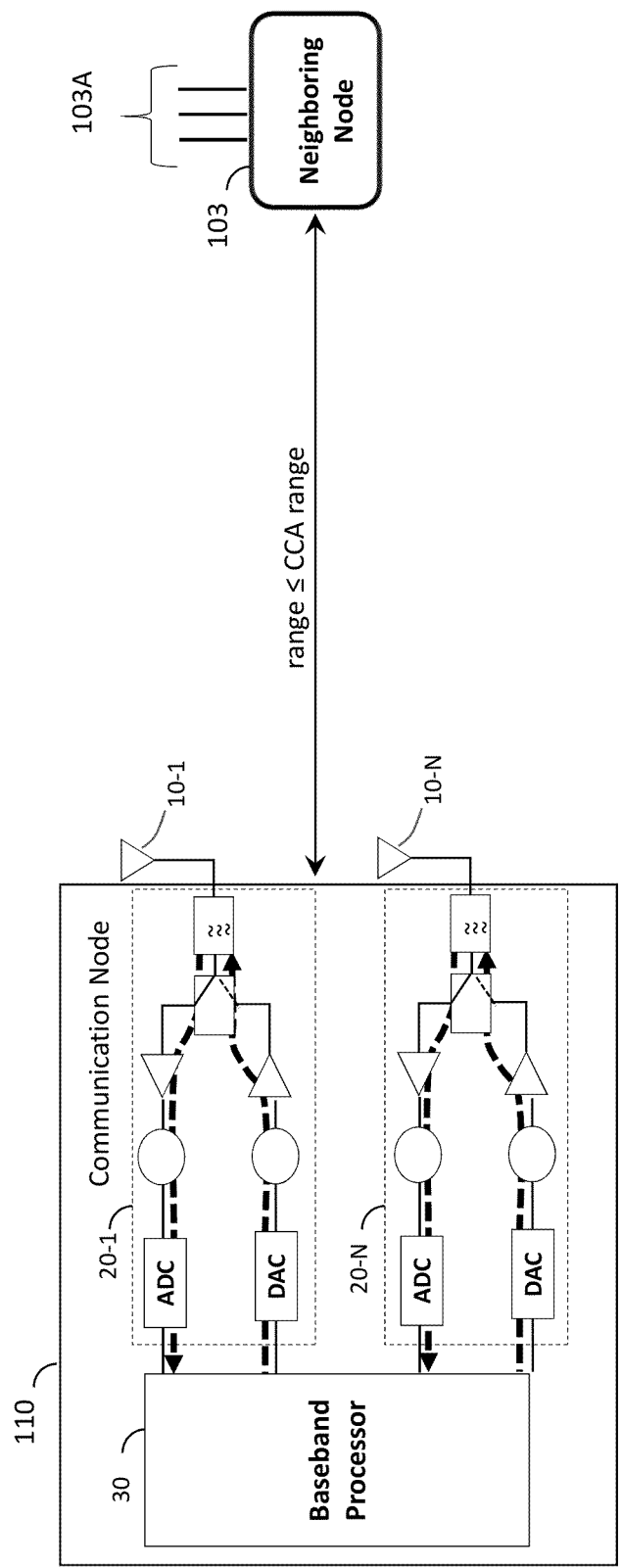
FIG. 1B is a block diagram illustrating a communication node within CCA range of a neighboring node, in accordance with some embodiments of the present invention.

FIG. 1B is a block diagram illustrating a communication node 110 within CCA range of a neighboring node 103, in accordance with some embodiments of the present invention.

Communication node 110 may include for example a plurality of antennas 10-1 to 10-N, a plurality of radio circuitries 20-1 to 20-N configured to transmit and receive signals via a plurality of antennas 10-1 to 10-N in compliance with the IEEE 802.11 standard, and a baseband processor 30. Communication node 110 may be configured to transmit and receive signals within a clear channel assessment (CCA) range of neighboring node 103 which has a plurality of antennas and may be configured to transmit and receive signals in a co-channel shared with communication node 110 in compliance with the IEEE 802.11 standard.

In operation, baseband processor 30 may be configured to set uplink transmit weights at radio circuitries 20-1 to 20-N and adjust the power level of the signal transmitted via antennas 10-1 to 10-N in a way that isolates communication node 110 from neighboring node 103 after neighboring node 103 has transmitted a preamble signal, in a manner that allows communication node 110 to access the co-channel, by keeping a transmitted signal level of communication node 110 as received by neighboring node 103, below the a signal power level associated with the CCA range at one or more of the antennas 103A of neighboring node 103.

According to some embodiments of the present invention, communication node 110 may be a station configured to be served by its serving access point (e.g., $AP_1$ 101 in FIG. 1A) and neighboring node 103 may be an AP which is serving its respective stations (but not serving communication node 110).

According to some embodiments of the present invention, communication node 110 may be a station that has at least two transmitting/receiving antennas, and is configured to set the weights while transmitting towards or in the direction of its serving AP, such that the weights minimize the energy received by neighboring AP's antennas 103A, constituting an uplink transmit null towards neighboring AP 103, wherein station 110 further lowers the power level transmitted by station 110, by an amount that keeps the estimated power received by neighboring AP 103 below CCA threshold at one or more of the antennas 103A of neighboring AP 103.

Figure 2:
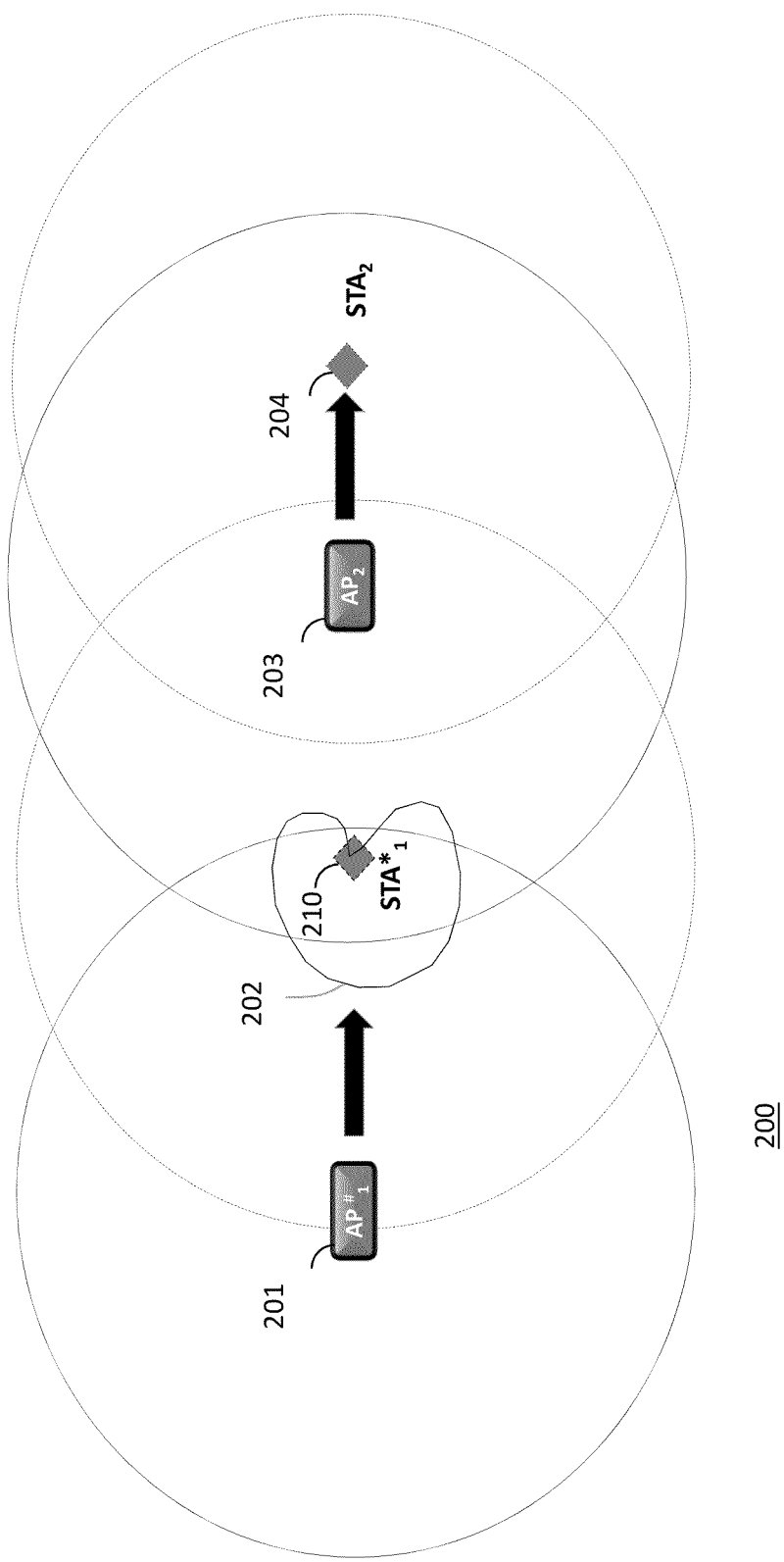
FIG. 2 is a block diagram illustrating a STA attempting to access the channel occupied by neighboring AP, via placing a null on its transmitting beam, in order to protect the neighboring AP's traffic from said STA's interference in accordance with some embodiments of the present invention.

FIG. 2 is a block diagram illustrating said STA 210 attempting to access the channel already occupied (e.g. being used for transmitting or receiving) by neighboring AP 203, via placing a Tx Null 202 that protects the neighboring AP's 203 receiver, allowing said STA 210 to receive a download packet from its serving AP 201.

Figure 3:
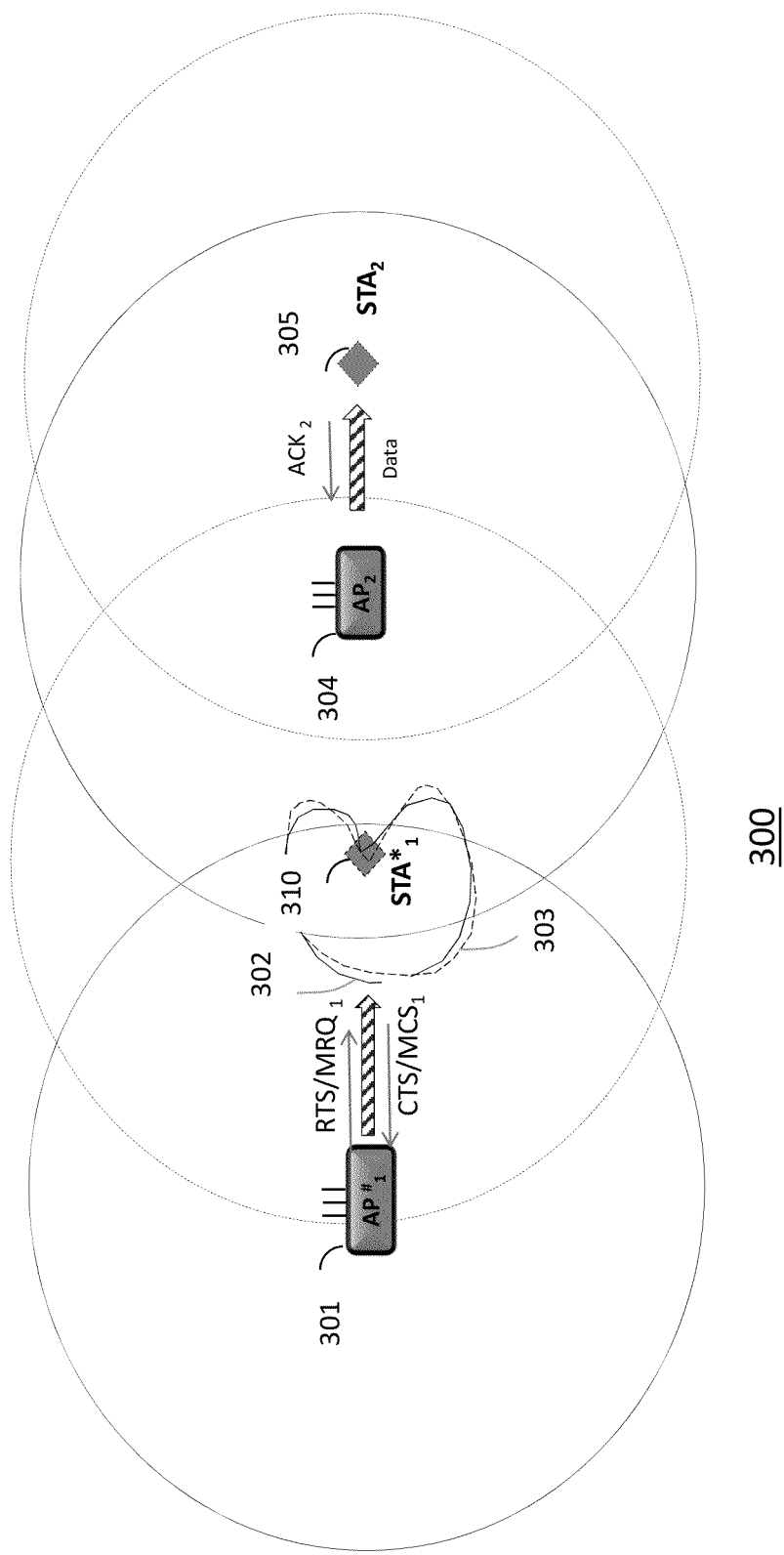
FIG. 3 is a block diagram illustrating a STA's transmit null established to enable the neighboring AP's successful reception of ACK from its respective served STA in accordance with some embodiments of the present invention.

FIG. 3 is a block diagram illustrating nulling STA 310 sequence of actions as follows: starting with forming Rx Null 303 towards the neighboring AP 304, minimizing the Preamble signal transmitted by a neighboring AP; using the Rx nulling weights as a basis to calculate a Tx null 302, which is pointed towards the antenna of the neighboring AP that transmitted the preamble; verifying that said Tx null sufficiently reduces the STA's interference received by said antennas, allowing the neighboring AP 304 to successfully receive the ACK coming from its served STA 305; once sufficient Tx nulling conditions are established by said nulling STA, it issues CTS to is serving AP 301; and in case AP 301's RTS is accompanied by MRQ, STA 310 adds MCS info to its CTS packet.

According to some embodiments of the present invention, station $STA*_1$ 310 further lowers the power level of the signals it transmits by an amount that keeps the estimated power received by access point $AP_2$ 304 below CCA threshold. In other words, $AP_2$ is thus kept beyond CCA range and will not receive the STA's transmission at a power level equal or higher than −82 dBm, for at least one of the $AP_2$'s antennas.

According to some embodiments of the present invention the uplink transmit null of station $STA*_1$ 310 and the power setting of station $STA*_1$ 310 are performed in order to protect the ACK reception of access point $AP_2$ 304 from being jammed by station $STA*_1$ 310's transmission.

According to some embodiments of the present invention, the uplink transmit null weights of station $STA*_1$ 310 are set prior to responding to serving access point $AP_1$ 301 request to send (RTS) with clear to send (CTS) signals.

According to some embodiments of the present invention, station $STA*_1$ 310 may monitor a destination address (associated with a destination node) of a packet from transmitting neighboring access point $AP_2$ 304 and if the destination node is recognized within CCA range of station $STA*_1$ 310, it will not clear to send (CTS).

Figure 4:
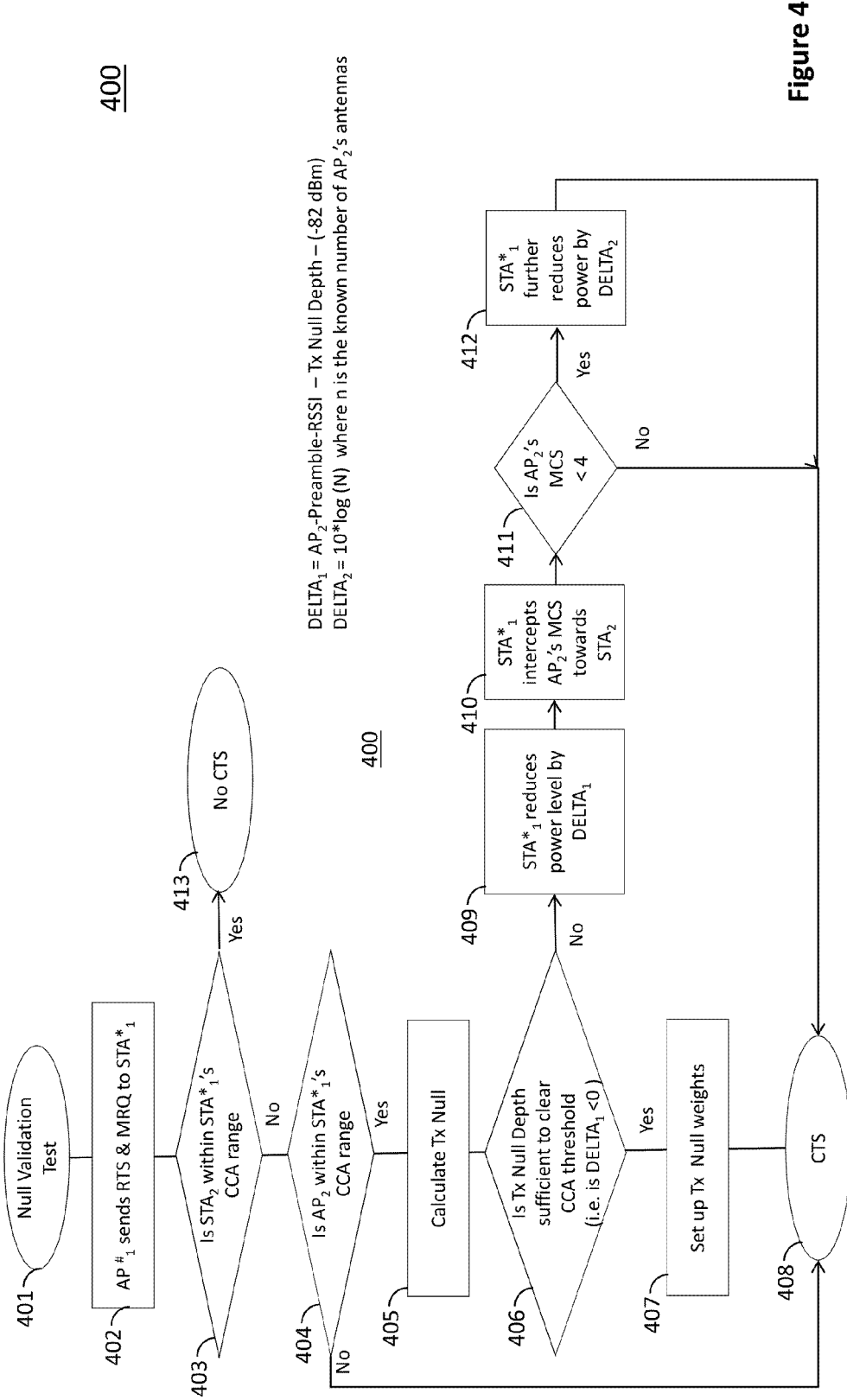
FIG. 4 is a high level flowchart illustrating a null validation test carried out in accordance with some embodiments of the present invention.

FIG. 4 is a high level flowchart 400 illustrating a null validation test 401 carried out by a station/client in order to enable a so-called "friendly" non-interrupting access to a Wi-Fi channel that is already being occupied by a neighboring access point in accordance with some embodiments of the present invention. In a first step, access point $AP^\#_1$ sends a request to send RTS and MRQ to station $STA*_1$ 402. A check whether station $STA_2$ is located within station $STA*_1$'s CCA range is carried out 403. According to some embodiments of the present invention, $STA*_1$ maintains or stores a neighbor list of the of STAs within CCA range and checks if the destination address $STA_2$ of a packet from transmitting neighboring access point $AP_2$ is in the neighbor list. In a case that station $STA_2$ is not within station $STA*_1$'s CCA range, a check whether access point $AP_2$ is located within station $STA*_1$'s CCA range is carried out 404. In case it is not within the range, there is no danger of interfering with the communication of access point $AP_2$ and so a CTS can be transmitted by station $STA*_1$ 408. In a case that point $AP_2$ is located within station $STA*_1$'s CCA range, station $STA*_1$ calculates transmit null 405 in a process that will be described in greater detail hereinafter. While calculating the null, a check whether the calculated null is sufficiently deep so as to clear the CCA threshold is carried out 406. Specifically, a metric named $DELTA_1$ is calculated being equal to the RSSI level of the preamble signal of access point $AP_2$ minus transmit null depth minus −82 dBm, namely: $AP_2$-Preamble-RSSI-Tx Null Depth-(−82 dBm). In a case that the null is sufficiently deep, transmit null weights are being set 407 and a CTS signal is being transmitted by station $STA*_1$ 408. In a case that the transmit null is not sufficiently deep, station $STA*_1$ reduces its transmit power level by a metric named $DELTA_1$ 409. Then, station $STA*_1$ intercepts access point $AP_2$'s MCS towards station $STA_2$ 410. A check whether access point $AP_2$'s MCS is smaller than 4 is carried out 411. In a case it is not smaller, a CTS signal is transmitted by station STA*408. In a case that it is smaller, station $STA*_1$ further reduces power by $DELTA_2$ which is equal to 10*log(N), wherein N is the number of access point $AP_2$'s antennas known to $STA*_1$ 412 and then goes on to send a CTS signal 408.

According to some embodiments of the present invention, station $STA*_1$ 310 may monitor MCS transmitted by neighboring access point $AP_2$ 304 and further reduces transmit power if MCS <4, by a $DELTA_2$, wherein $DELTA_2$=10*log (N) dB, and N is the known number of said neighboring transmitting AP's antennas.

According to some embodiments of the present invention, the transmit uplink null formed by station $STA*_1$ 310 is calculated for example as follows: station $STA*_1$ 310 performs channel estimation and absolute value calculation of the Legacy Long Training Field (L-LTF) field of the Preamble signal transmitted by neighboring access point $AP_2$ 304, via each of its receiving antennas, and comparing the various said antennas received power level, it registers the highest-power-level as highest received signal strength indication (RSSI); station STA*$_1$ 310 sets weights for the receiving antenna such that total received power of said Preamble signal's L-LTF is minimized, yielding an estimated receive null weighting matrix W, and registering said minimized-power-level as nulled RSSI; and using reciprocity calibration said station converts said receive null weighting matrix W into a transmit null weighting matrix Ŵ.

According to some embodiments of the present invention, station STA*$_1$ 310 calculates the difference between highest RSSI and the nulled RSSI, said difference being defined as receive null depth.

Figure 5:
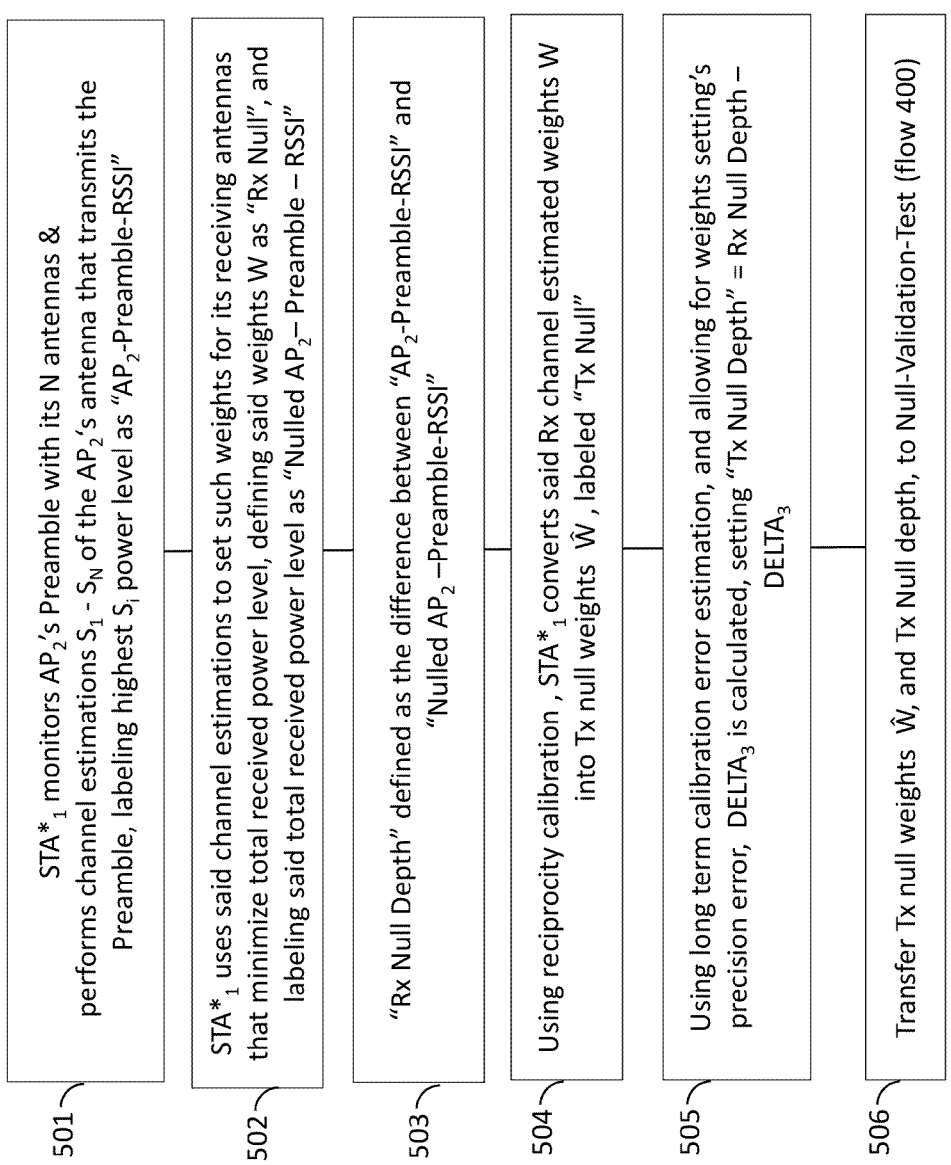
FIG. 5 is a flowchart illustrating a transmission null calculation in accordance with some embodiments of the present invention.

FIG. 5 is a flowchart 500 illustrating a transmission null calculation in accordance with one embodiment of the present invention. The null calculation begins with a step in which station STA*$_1$ monitors access AP$_2$'s Preamble with its N antennas and performs channel estimations $S_1$-$S_N$ of the access AP$_2$'s antenna that transmits the Preamble, labeling highest $S_i$ power level as "AP$_2$-Preamble-RSSI" 501. Then, station STA*$_1$ uses the channel estimations to set such weights for its receiving antennas that minimize total received power level, defining said weights Was "Rx Null", and labeling the total received power level as "Nulled AP$_2$-Preamble-RSSI" 502. "Rx Null Depth" is defined as the difference between "AP$_2$-Preamble-RSSI" and "Nulled AP$_2$-Preamble-RSSI" 503. Then, using reciprocity calibration as will be described in greater detail hereinafter in FIG. 6, station STA*$_1$ converts said receive channel estimated weights W into transmit null weights Ŵ, labeled "Tx Null" 504. Then, using long term calibration error estimation, and allowing for weights setting's precision error, DELTA$_3$ is calculated, setting "Tx Null Depth"=Rx Null Depth−DELTA$_3$ 505. Finally, transmit null weights Ŵ, and Tx Null depth, are transferred to the aforementioned Null-Validation-Test depicted herein in FIG. 4.

According to some embodiments of the present invention, station STA*$_1$ 310 estimates the transmit null depth, based on the receive null depth, minus a calculated margin DELTA$_3$ representing imperfection of receive/transmit null calibration due to aging and temperature variations, and due to limited precision of phase and amplitude setting.

According to some embodiments of the present invention, aforementioned margin DELTA$_3$ is determined by a combination of measured phase and amplitude drift between consecutive off-line reciprocity calibration, and a tolerance of phase and amplitude setting precision measured at factory.

According to some embodiments of the present invention said transmit null depth is compared with the highest RSSI level received by an antenna of station STA*$_1$ 310 and if said highest RSSI minus transmit null depth >−82 dBm, station STA*$_1$ 310 will reduce its transmission power DELTA$_1$ so that the highest RSSI minus transmit null depth minus DELTA$_1$ will be lower than −82 dBm.

According to some embodiments of the present invention, following the RTS and MRQ sent by station's serving AP, station STA*$_1$ 310 will set up Tx Null, estimate received RTS SINR, and respond to serving access point AP$_1$ 301 with CTS and MCS that corresponds to the aforementioned SINR.

Figure 6:
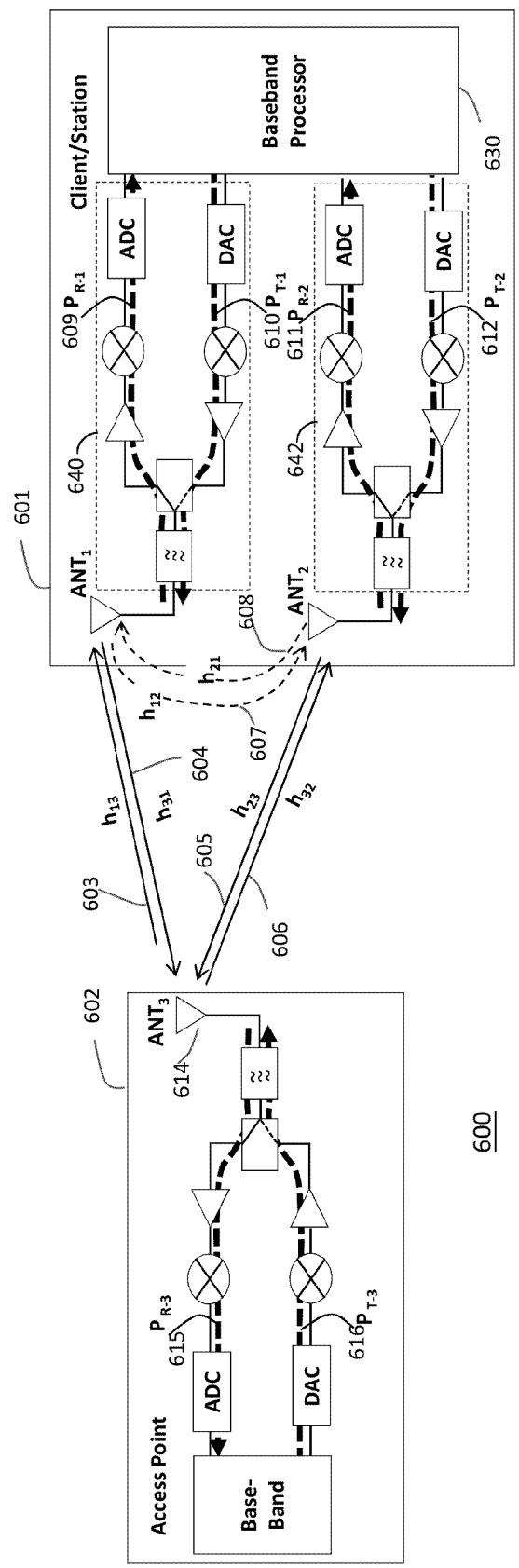
FIG. 6 is block diagram illustrating channel reciprocity calibration carried out in accordance with some embodiments of the present invention.

FIG. 6 is a block diagram 600 illustrating channel reciprocity calibration carried out for nulling purposes in accordance with one embodiment of the present invention, including an Access Point 602 and Client/Station 601. Access Point 602 may include antenna ANT$_3$ 614, internal receiving path P$_{R-3}$ 615, and internal transmitting path P$_{T-3}$ 616. Client/Station 601 may include: baseband processor 630, radio frequency (RF) circuitries 640 and 642, antennas ANT1 and ANT2, having channels h$_{12}$ 607 and h$_{21}$ 608. Client/Station 601 calibrates the internal receiving path P$_{R-1}$ 609 versus the internal transmitting path P$_{T-1}$ 610, registering circuitry biases at various transmit level; Client/Station 601 estimates received signal from ANT$_1$ channel=h$_{13}$ 603+P$_{R-1}$609, and Converts P$_{R-1}$ 609 into P*$_{T-1}$ via said calibration, substitutes h$_{31}$ 604=h$_{13}$ 603, and thus creating reciprocal transmit signal P*$_{T-1}$+h$_{31}$ 604. Similarly, Client/Station 601 Calibrates the internal receiving path P$_{R-2}$ 611 versus the internal transmitting path P$_{T-2}$ 612, registering circuitry biases at various Tx level; Client/Station 601 estimates received signal from ANT$_3$ channel=h$_{32}$ 606+P$_{R-2}$ 611, and Converts P$_{R-2}$ 611 into P*$_{T-2}$ via said calibration, substitutes h$_{32}$ 606=h$_{23}$ 605, and thus creating reciprocal transmit signal P*$_{T-2}$+h$_{23}$ 605.

According to some embodiments of the present invention, station STA*$_1$ 310 may perform an off-line calibration of receive versus transmit nulls, and may calculate a conversion matrix between W and Ŵ. An off-line calibration may be for example a calibration that may be carried out at the factory, prior to operation within a Wi-Fi network, or when the STA ceases regular operation periodically or when required by self or remote indicators. The aforementioned conversion matrix is measured and calculated per frequency subcarrier.

Figure 7:
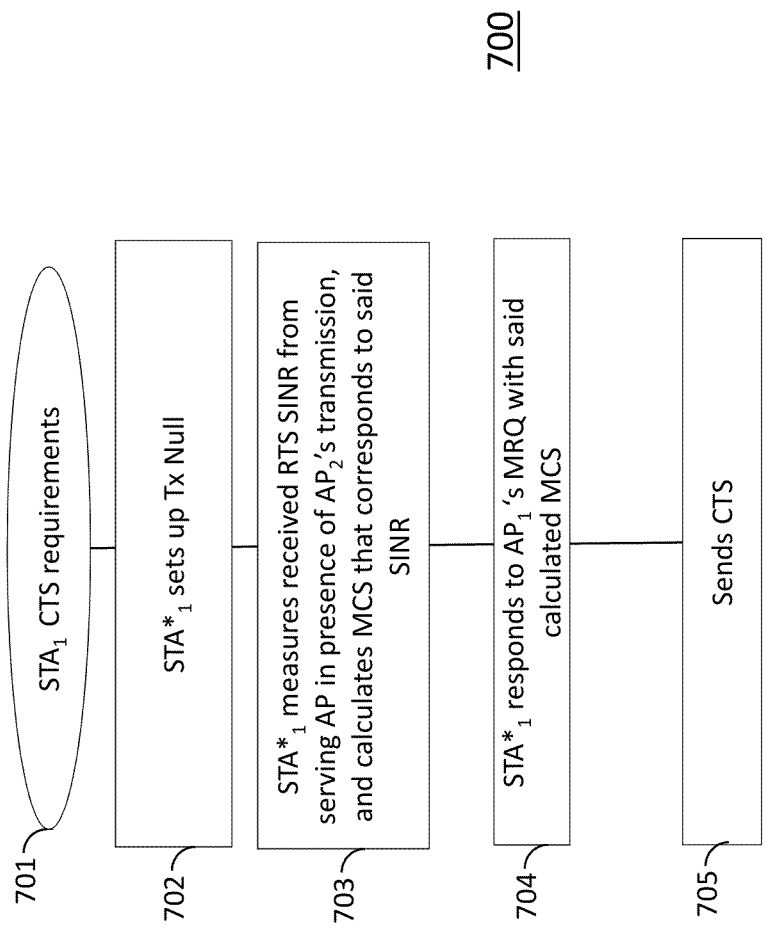
FIG. 7 is a flowchart illustrating a procedure of checking sufficiency of MCS in accordance with some embodiments of the present invention.

FIG. 7 is a flowchart 700 illustrating a procedure of checking requirements for transmitting clear to send (CTS) signal for station STA*$_1$ 701 in accordance with one embodiment of the present invention. The procedure starts with setting up the transmit null by station STA*$_1$ 702. Then, station STA*$_1$ measures received RTS SINR from serving access point in presence of access point AP$_2$'s transmission, and calculates MCS that corresponds to said SINR 703. Station STA*$_1$ then responds to access point AP$_1$'s MRQ with said calculated MCS 704 and then sends CTS signal 705.

Figure 8:
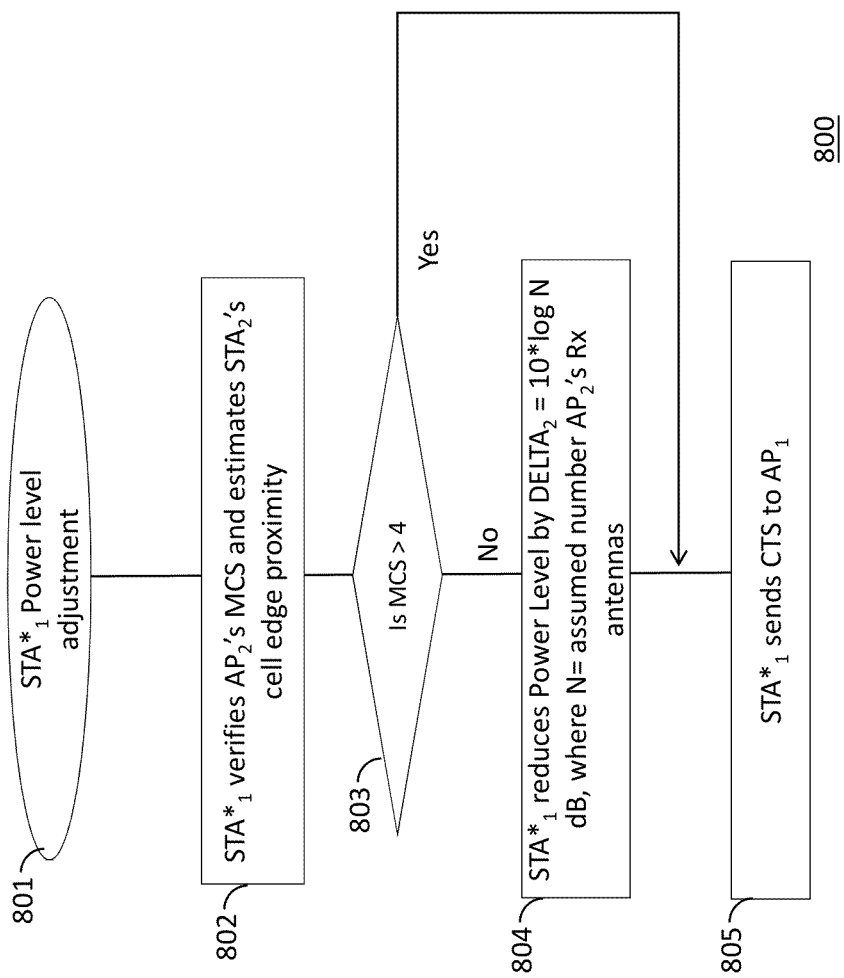
FIG. 8 is a flowchart illustrating a procedure of cell edge detection and power level adjustment, in accordance with one embodiment of the present invention.

FIG. 8 is a flowchart 800 illustrating a procedure of cell edge detection and power adjustment 801 by station STA*$_1$, in accordance with one embodiment of the present invention. In step 802, station STA*$_1$ verifies access point AP$_2$'s MCS and estimates station STA$_2$'s cell edge proximity. Then, the MCS is checked to be greater than 4 803. In a case it is greater than 4, station STA*$_1$ sends CTS to access point AP$_1$ 805. In a case it is not greater than 4, station STA*$_1$ reduces Power Level by a metric named DELTA$_2$ being equal to 10*log N dB, wherein N=assumed number access point AP$_2$'s Rx antennas 804 and only then station STA*$_1$ sends CTS to access point AP$_1$ 805.

Figure 9:
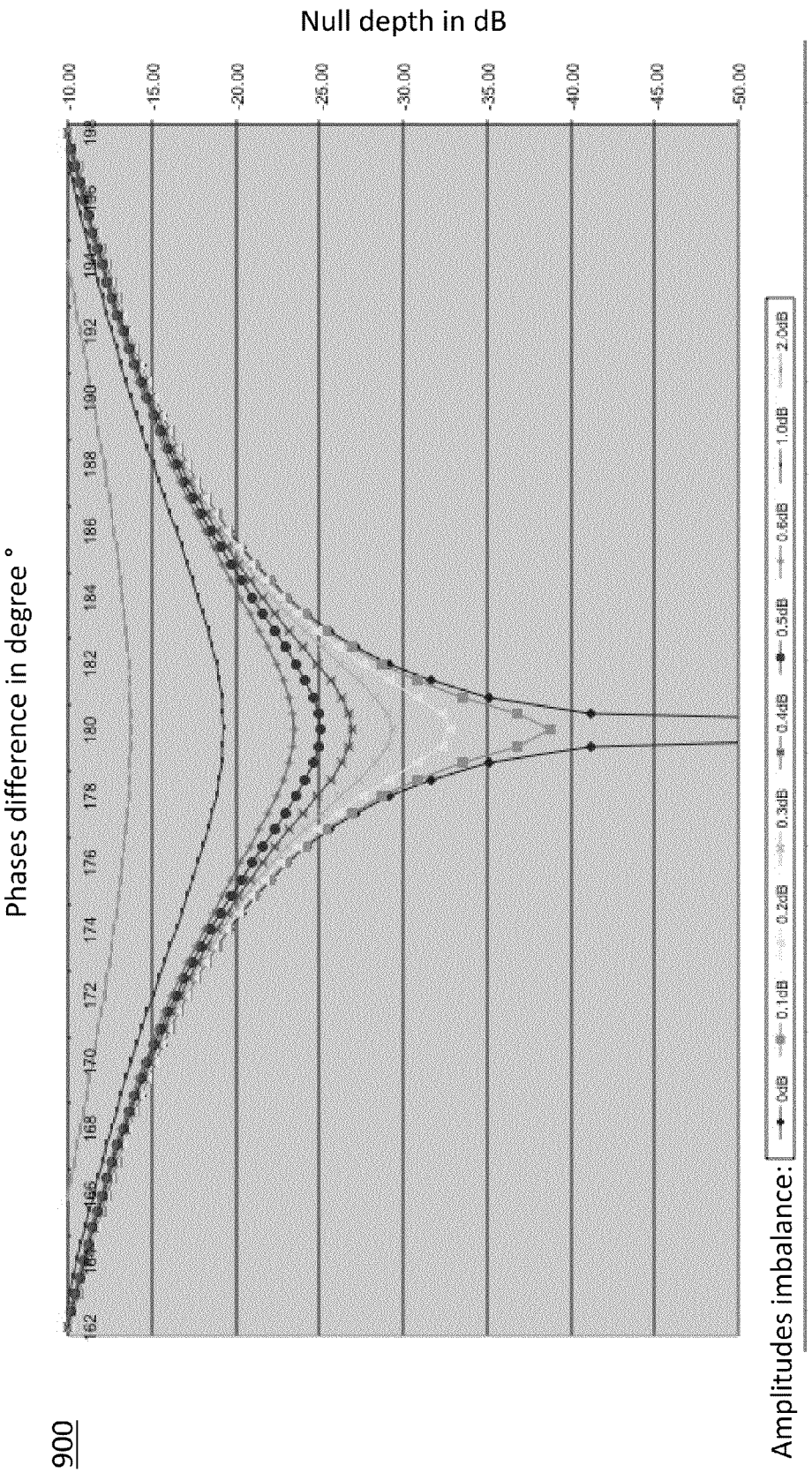
FIG. 9 is graph diagram comparing different types of nulls in accordance with some embodiments of the present invention.

FIG. 9 is graph diagram demonstrating nulls created by two antennas and a combiner that tries to set them into equal amplitudes and opposite phases; there can be seen a null depth deteriorations as a function of amplitude inaccuracy (e.g., imbalance) or phases differences inaccuracy (e.g. #≈180°). The smaller are the inaccuracies, the deeper the null is.

Figure 10:
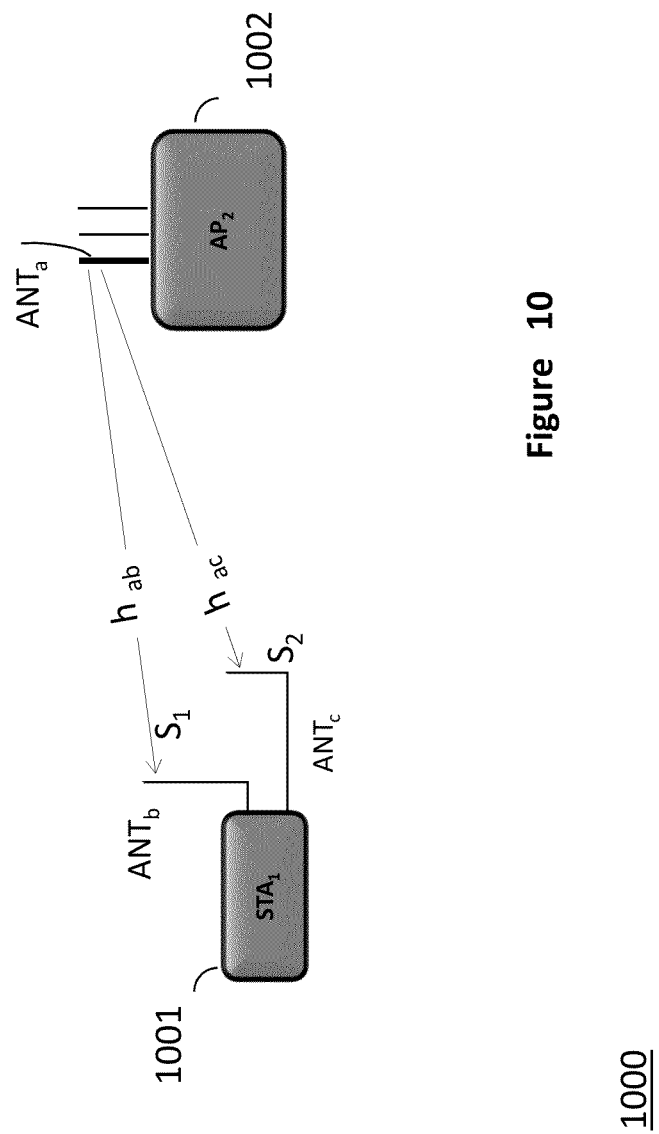
FIG. 10 is a block diagram illustrating non-limiting example of calculating a receive null in accordance with some embodiments of the present invention.

FIG. 10 is a block diagram illustrating a non-limiting example of generating a transmit null in accordance with one embodiment of the present invention. The aim of the null is ANT$_a$ of access point AP$_2$'s 1002 which is the antenna that transmits the Preamble signal. In order to effectively null it so that the Preamble is not interfered with, STA*$_1$ 1001 performs channel estimations h-$_{ab}$ and h-$_{ac}$. As a result, ANT$_b$ and ANT$_c$ receive $S_1$ and $S_2$ Measuring at station STA*$_1$ 310; RSSI-$_b$ and RSSI-$_c$ are the power level of ANT$_a$ preamble as received by ANT$_b$ and ANT$_c$, respectively at station STA*$_1$1001; the highest RSSI is defined as "AP$_2$-Preamble-RSSI". Then, a receive null is being calculated by setting receive weights matrix W so that S=W*H is minimized Finally, W is defined as a matrix that minimizes S as "Rx Null".

FIG. 11 is a high level flowchart illustrating a method 1100 in accordance with some embodiments of the present invention. Method 1100 may include for example detecting at a communication node having a plurality of antennas, a preamble transmitted by a co-channel neighboring node operating in compliance with IEEE 802.11 standard within a clear channel assessment (CCA) range of said communication node 1110; and setting uplink transmit weights of said antennas of said communication node and further adjusting transmit power level of said communication node in a way that isolates said communication node from said neighboring node after said neighboring node has transmitted said preamble, in a manner that allows said communication node to access the co-channel, by keeping a transmitted signal level of said communication node as received by said neighboring node, below the CCA signal level at one or more of the antennas of said neighboring node 1120.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." For example, a baseband processor or other processor may be configured to carry out methods of the present invention by for example executing code or software.

The aforementioned flowcharts and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A communication node comprising:
a plurality of antennas;
a plurality of radio circuitries configured to transmit and receive signals via the plurality of antennas; and
a baseband processor,
wherein said communication node is located within a clear channel assessment (CCA) range of a neighboring node, wherein the communication node and the neighboring node share a co-channel in compliance with an IEEE 802.11 standard, wherein the baseband processor is configured to set uplink transmit weights after said neighboring node has transmitted a preamble, for transmitting a signal power level of said communication node, as received by said neighboring node, below a signal power level associated with the CCA range, at one or more of the antennas of said neighboring node,
wherein said communication node is a station configured to be served by the access point (AP) serving said communication node, and the neighboring node is an AP which is serving its respective stations, and wherein said station and APs operate in compliance with the IEEE 802.11 standard, wherein said station monitors Modulation Coding Scheme (MCS) transmitted by said neighboring AP, and further reduces transmit power if MCS <4, by a $DELTA_2$, wherein $DELTA_2=10*\log(N)$ dB, and N is the known number of said neighboring transmitting AP's antennas.

2. The node according to claim 1, wherein the baseband processor is further configured to adjust the power level of the transmitted signal.

3. The node according to claim 1, wherein said communication node is a station and has at least two transmitting/receiving antennas, and is configured to set the uplink transmit weights while transmitting towards the AP serving said communication node, such that the uplink transmit weights minimize the energy received by said neighboring AP's antenna, constituting an uplink transmit null towards said neighboring AP.

4. The node according to claim 3, wherein said station lowers the power level transmitted by said station, by an amount that keeps the estimated power received by said neighboring AP below a CCA threshold at one or more of the antennas of said neighboring AP.

5. The node according to claim 4, wherein station's uplink transmit null, and the station power setting are performed in order to protect said neighboring APs' ACK reception from being jammed by said station's transmission.

6. The node according to claim 4, wherein the uplink transmit null weights are set prior to responding to said serving AP's request to send (RTS) with clear to send (CTS) signals.

7. The node according to claim 4, wherein said station monitors a destination address associated with a destination node of a packet from said transmitting neighboring AP and if the destination node is recognized within CCA range of said station, said station will not reply a clear to send (CTS).

8. The node according to claim 4, wherein the transmit uplink null formed by said station, is calculated as follows:
said station performs channel estimation and absolute value calculation of the Legacy Long Training Field (L-LTF) field of the Preamble signal transmitted by said neighboring AP, via each of its receiving antennas, and comparing the various said antennas received power level, said station registers the highest-power-level as highest received signal strength indication (RSSI);
said station sets weights for said receiving antenna such that total received power of said Preamble signal's L-LTF is minimized, yielding an estimated receive null weighting matrix W, and registering said minimized-power-level as nulled RSSI; and
using reciprocity calibration said station converts said receive null weighting matrix W into a transmit null weighting matrix $\hat{W}$.

9. The node according to claim 8, wherein said station calculates the difference between highest RSSI and the nulled RSSI, said difference being defined as receive null depth.

10. The node according to claim 9, wherein said station estimates the transmit null depth, based on the receive null depth, minus a calculated margin $DELTA_3$ representing imperfection of receive/transmit null calibration due to aging and temperature variations, and due to limited precision of phase and amplitude setting.

11. The node according to claim 10, wherein said margin $DELTA_3$ is determined by a combination of measured phase and amplitude drift between consecutive off-line reciprocity calibration, and a tolerance of phase and amplitude setting precision measured at factory.

12. The node according to claim 10, wherein said transmit null depth is compared with the highest RSSI level received by a station's antenna, and if said highest RSSI minus transmit null depth >−82 dBm, the station reduces reduce transmission power by a $DELTA_1$ so that the highest RSSI minus transmit null depth minus $DELTA_1$<−82 dBm.

13. The node in claim 8, wherein the station performs off-line calibration of receive versus transmit nulls, and calculates a conversion matrix between W and $\hat{W}$; said conversion matrix is measured and calculated per frequency subcarrier.

14. The node according to claim 4, wherein following a request to send (RTS) and a Modulation Code Scheme Request (MRQ) sent by the station's serving AP, said station will set up transmit null, estimate received RTS Signal to Noise plus Interference Ratio (SINR), and respond to said serving AP with CTS and Modulation Coding Scheme (MCS) that corresponds to said SINR.

15. A method comprising:
detecting at a communication node having a plurality of antennas, a preamble transmitted by a co-channel neighboring node, wherein the communication node is configured to transmit and receive signals in compliance with IEEE 802.11 standard within a clear channel assessment (CCA) range of said neighboring node; and
setting uplink transmit weights of said antennas of said communication node for transmitting a signal power level of said communication node, as received by said neighboring node, below a signal power level associated with the CCA range, at one or more of the antennas of said neighboring node, wherein said communication node is a station configured to be served by its serving Access point (AP) and the neighboring node is an AP which is serving stations associated therewith, and wherein said station, and APs all operate in compliance with the 802.11 standard, wherein said station monitors Modulation Coding Scheme (MCS) transmitted by said neighboring AP, and further reduces transmit power if MCS <4, by a $DELTA_2$, wherein $DELTA_2=10*\log(N)$ dB, and N is the known number of said neighboring transmitting AP's antennas.

16. The method according to claim 15, further comprising adjusting transmit power level of said communication node.

17. The method according to claim 15, wherein said communication node is a station and has at least two transmitting/receiving antennas, and sets the uplink transmit weights while transmitting towards the AP serving said communication node, such that the uplink transmit weights minimize the energy received by said neighboring AP's antenna, constituting an uplink transmit null towards said neighboring AP.

18. The method according to claim 15, wherein said station further lowers the power level transmitted by said station, by an amount that keeps the estimated power received by said neighboring AP below CCA threshold at one or more of the antennas of said neighboring AP.

19. The method according to claim 18, wherein station's uplink transmit null, and the station power setting are performed in order to protect said neighboring APs' ACK reception from being jammed by said station's transmission.

20. The method according to claim 18, wherein the uplink transmit null weights are set prior to responding to said serving AP's request to send (RTS) with clear to send (CTS) signals.

21. The method according to claim 18, wherein said station monitors a destination address associated with a destination node of a packet from said transmitting neighboring AP and if the destination node is recognized within CCA range of said station, said station will not reply a clear to send (CTS).

22. The method according to claim 18, wherein the transmit uplink null formed by said station, is calculated as follows:

said station performs channel estimation and absolute value calculation of the L-LTF field of the Preamble signal transmitted by said neighboring AP, via each of its receiving antennas, and said station compares the various said antennas received power level, and said station registers the highest-power-level as highest received signal strength indication (RSSI);

said station sets weights for said receiving antenna such that total received power of said preamble signal's Legacy Long Training Field (L-LTF) is minimized, yielding an estimated receive null weighting matrix W, and registering said minimized-power-level as nulled RSSI; and using reciprocity calibration said station converts said receive null weighting matrix W into a transmit null weighting matrix $\hat{W}$.

23. The method according to claim 22, wherein said station calculates the difference between highest RSSI and the nulled RSSI, said difference being defined as receive null depth.

24. The method according to claim 23, wherein said station estimates the transmit null depth, based on the receive null depth, minus a calculated margin $DELTA_3$ representing imperfection of receive/transmit null calibration due to aging and temperature variations, and due to limited precision of phase and amplitude setting.

25. The method according to claim 24, wherein said margin $DELTA_3$ is determined by a combination of measured phase and amplitude drift between consecutive off-line reciprocity calibration, and a tolerance of phase and amplitude setting precision measured at factory.

26. The method according to claim 22, wherein the station performs off-line calibration of receive versus transmit nulls, and calculates a conversion matrix between W and $\hat{W}$; said conversion matrix is measured and calculated per frequency subcarrier.

* * * * *